(12) United States Patent
Kamakura et al.

(10) Patent No.: US 10,957,197 B2
(45) Date of Patent: Mar. 23, 2021

(54) VEHICLE DRIVING ASSISTANCE SYSTEM

(71) Applicant: HONDA MOTOR CO., LTD., Tokyo (JP)

(72) Inventors: Hiroshi Kamakura, Wako (JP); Minoru Kobayashi, Wako (JP); Masataka Izawa, Wako (JP); Takahiro Kurehashi, Wako (JP); Hiroki Nakajima, Wako (JP); Yoshinori Kinoshita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/824,245

(22) Filed: Mar. 19, 2020

(65) Prior Publication Data

US 2020/0312143 A1 Oct. 1, 2020

(30) Foreign Application Priority Data

Mar. 28, 2019 (JP) .............................. JP2019-064517

(51) Int. Cl.
*G08G 1/09* (2006.01)
*G08G 1/0967* (2006.01)
*G08G 1/087* (2006.01)
*G08G 1/095* (2006.01)
*B60W 30/18* (2012.01)
*G08G 1/01* (2006.01)

(52) U.S. Cl.
CPC . *G08G 1/096783* (2013.01); *B60W 30/18154* (2013.01); *B60W 30/18159* (2020.02); *G08G 1/0116* (2013.01); *G08G 1/087* (2013.01); *G08G 1/095* (2013.01); *B60W 2540/30* (2013.01)

(58) Field of Classification Search
CPC .................. G08G 1/096783; B60W 30/18159
USPC ............... 340/905, 907, 917, 921, 988, 995
See application file for complete search history.

(56) References Cited

U.S. PATENT DOCUMENTS

2015/0360684 A1* 12/2015 Matsuno .................. B60Q 9/00
701/23
2016/0075330 A1* 3/2016 Oguri ....................... B60T 7/12
701/70

FOREIGN PATENT DOCUMENTS

JP 2010244308 A 10/2010

* cited by examiner

*Primary Examiner* — Tai T Nguyen
(74) *Attorney, Agent, or Firm* — Rankin, Hill & Clark LLP

(57) ABSTRACT

A vehicle driving assistance system capable of providing a driver of a vehicle with appropriate driving assistance when the vehicle is approaching an intersection. If a traffic signal includes multiple aspects that are in accord with the directions of traffic movement at an intersection, an identifier determines whether an intended direction of movement (an intention to turn right or left) at the intersection has been received from a driver through an identifying device. If the identifier has received an intended direction of movement, an aspect (a right-turn or left-turn arrow aspect) for which assistance is provided through communication by a reporter is identified. The reporter then assists the right or left turn of the vehicle for the intersection in step S7. If the identifier does not receive an intended direction of movement from the driver, the reporter assists only a straight-ahead movement of the vehicle in step S7.

6 Claims, 4 Drawing Sheets

VEHICLE DRIVING ASSISTANCE SYSTEM

CROSS-REFERENCE TO RELATED APPLICATIONS

This application is based upon and claims the benefit of priority from Japanese Patent Application No. 2019-064517 filed on Mar. 28, 2019, the entire contents of which are incorporated herein by reference.

TECHNICAL FIELD

The disclosure relates to a vehicle driving assistance system.

BACKGROUND ART

The traffic signal prediction systems (TSPS) is a known system for assisting the driving of vehicles through signalized intersections by using traffic signal information acquired from optical beacons and so on.

Patent literature 1 (Japanese Unexamined Patent Application Publication No. 2010-244308) discloses a vehicle driving assistance system where a travelling vehicle receives information regarding a traffic signal at an intersection from outside the vehicle and uses this information to travel through the intersection.

Technology proposed in patent literature 1 is as follows. First, when a vehicle approaches an intersection with a traffic signal, the vehicle receives information regarding the traffic signal from outside the vehicle. The received information includes the current color light that is illuminated, the duration each color light is illuminated, and the remaining time in seconds for the current color light to change to the next color light (remaining time, wait time). From the received information and the vehicle's location and vehicular speed, the time taken for the vehicle to arrive at the intersection (hereinafter "approach time") is calculated. If the approach time is longer than the time the traffic signal takes to change the indicated color light from green to amber or red, a notification is given out advising the driver to start decelerating the vehicle.

SUMMARY

There are, however, intersections where a traffic signal is fitted with, say, a right-turn arrow aspect, so that the time a vehicle is allowed passage through the intersection depends on the vehicle's direction of movement. At such intersections, it would be preferable if a vehicle's system could provide traffic signal assistance that was in accord with the left or right turn a vehicle's driver was to make at an intersection. The timing with which assistance is provided by such a system would come when the vehicle is still some distance away from the intersection. However, at such a distance, it is not possible for the system to identify the driver's intended direction of movement through detecting a turn signal operation, steering action, or lane change. For these reasons, driving assistance could not be provided adequately at such intersections.

Moreover, when a traffic signal has multiple aspects that are in accord with the directions of traffic movement, for example a right-turn arrow aspect, left-turn arrow aspect, and straight-ahead arrow aspect, having assistance information displayed for all three possible movements (a left turn, go straight ahead, and a right turn) is distracting to a driver. However, such a display would be inevitable if the driver's intended direction of movement at an intersection was unknown.

It is an object, therefore, to provide a vehicle driving assistance system that is capable of providing a driver of a vehicle with appropriate driving assistance when the vehicle is approaching an intersection.

The vehicle driving assistance system includes a receiver, a remaining distance calculator, a travel-speed-range calculator, a reporter, and an identifier. The receiver receives, from outside an assisted vehicle, traffic signal information for a traffic signal (hereinafter "traffic signal information") at an intersection, wherein the traffic signal information includes (a) a length of time a color light of the traffic signal is illuminated (hereinafter an "illumination period") and (b) information on a transition between illuminated color lights. The remaining distance calculator calculates a remaining distance from a location of the assisted vehicle to the intersection. The travel-speed-range calculator calculates a range of travel speed (hereinafter a "travel speed range") within which the assisted vehicle is allowed to pass through the intersection while following the traffic signal based on the traffic signal information and the remaining distance. The reporter gives driving assistance information through communication via a display and/or an audio output based on the travel speed range and a current speed of the assisted vehicle, the communication being either to assist in deceleration or to assist in passage through the intersection within the travel speed range. When the traffic signal has multiple aspects that are in accord with directions of traffic movement at the intersection and when the assisted vehicle is at a specific distance upstream of the intersection, the identifier receives an intended direction of movement at the intersection from a driver of the assisted vehicle and identifies the aspect for which assistance is provided through communication by the reporter.

The vehicle driving assistance system is capable of providing appropriate driving assistance to a driver of a vehicle when the vehicle is approaching an intersection.

BRIEF DESCRIPTION OF THE DRAWINGS

The disclosure will become more fully understood from the following detailed description, taken in conjunction with the accompanying figures.

DETAILED DESCRIPTION OF AN EMBODIMENT

A description of an embodiment is given below.

Figure 1:
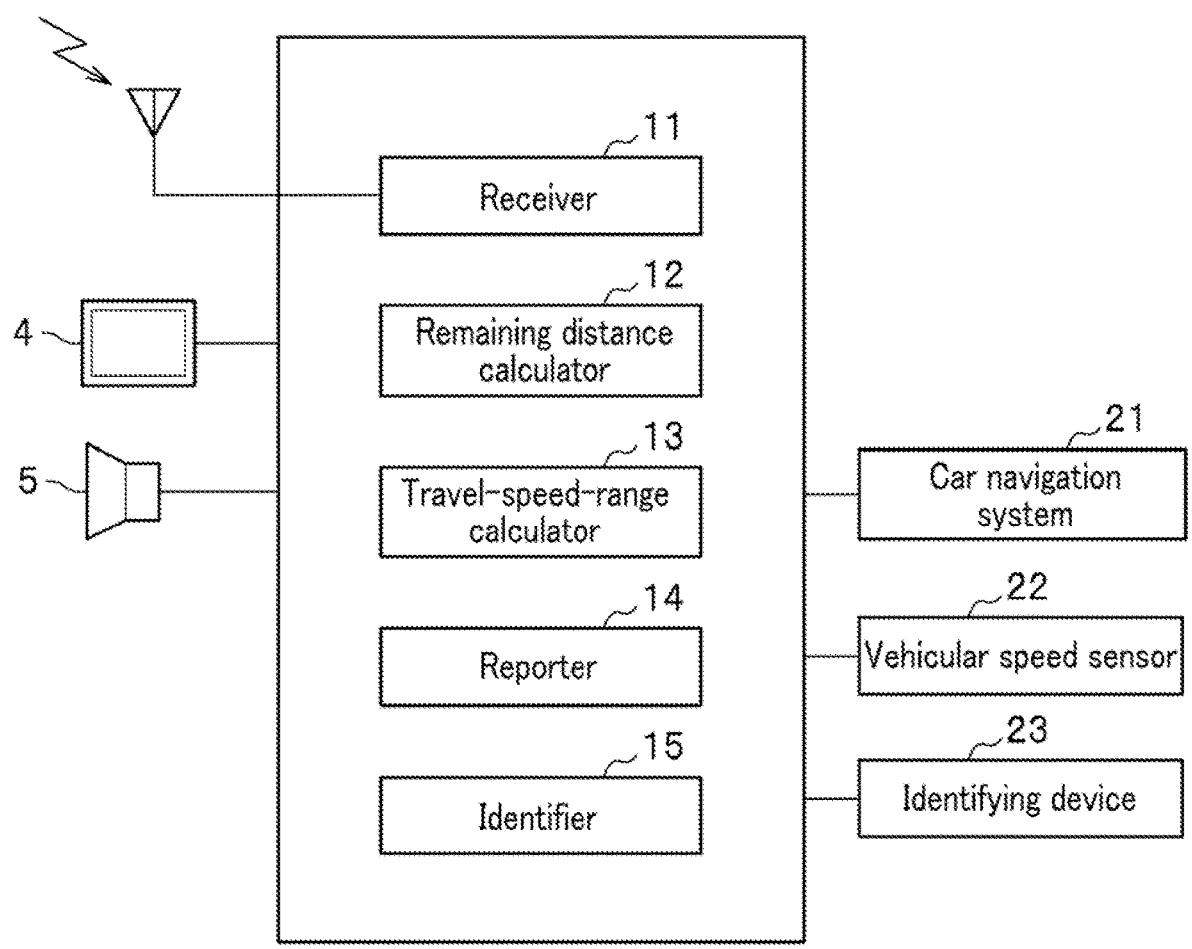
FIG. 1 is a block diagram showing the configuration of a vehicle driving assistance system according to an embodiment.

FIG. 1 is a block diagram showing the configuration of a vehicle driving assistance system installed in a vehicle (hereinafter an "assisted vehicle"). The vehicle driving assistance system 1 is configured from a microcomputer and so on, and is equipped with a display 4 that may be used to display a specific message and an audio output 5 that may be used to output sound. Furthermore, the vehicle driving assistance system 1 is connected to a car navigation system 21 and a vehicular speed sensor 22. The car navigation system 21 is equipped with a satellite navigation system such as the GPS (global positioning system), and the vehicular speed sensor 22 is a device for detecting vehicular speed. Furthermore, the vehicle driving assistance system 1 is equipped with an identifying device 23 that detects the intended direction of movement of a driver of an assisted vehicle at an intersection.

The vehicle driving assistance system 1 executes the functions of a receiver 11, a remaining distance calculator 12, a travel-speed-range calculator 13, a reporter 14, and an identifier 15 that are illustrated as function blocks in FIG. 1.

The receiver 11 receives information on a traffic signal of an intersection (hereinafter "traffic signal information") from outside an assisted vehicle from an optical beacon on the roadside, from information delivered by a provider, and so on. The traffic signal information includes at the very least the following: (a) an illumination period of a color light of the traffic signal, and (b) information on a transition from one illuminated color light to another.

The remaining distance calculator 12 derives the distance that remains for an assisted vehicle to reach an intersection (hereinafter the "remaining distance") by calculating the distance between the location of the assisted vehicle and the intersection.

The travel-speed-range calculator 13 calculates, based on the traffic signal information and the remaining distance, the range of travel speed within which the assisted vehicle is allowed to pass through the intersection while following the traffic signal.

The reporter 14 communicates driving assistance information that assist a driver to decelerate the assisted vehicle or to pass through the intersection within a speed range based on the calculated range of travel speed and the current speed of the assisted vehicle. This communication is done via a display 4 or an audio output 5.

When a traffic signal includes multiple aspects that are in accord with the directions of traffic movement at an intersection, and when the assisted vehicle is at a specific distance upstream of the intersection, the identifier 15 receives from the driver the intended direction of movement at the intersection via the identifying device 23, and identifies which of the multiple aspects assistance is to be provided for through communication by the reporter 14. The multiple aspects that are in accord with the directions of traffic movement at an intersection refers to a right-turn arrow aspect, left-turn arrow aspect, and straight-ahead arrow aspect, and so on.

The identifying device 23 may be configured in various ways. The following examples from 1 to 3 may be used as an identifying device 23.

Example 1. A driver's intention to turn right (or left) at an intersection may be indicated through lightly tapping a turn signal lever (not shown in figure) upwards or downwards. This is similar to the one-touch turn signal operation. This action may be carried out when the assisted vehicle is still too distant from an intersection for the turn signal lever to be operated for the purpose of indicating a right or left turn at the intersection. In this example, the identifying device 23 is configured from a turn signal lever.

Example 2. Alternatively, a driver's intention to turn right (or left) at an intersection may be indicated by operating a "hands on detection" sensor (a capacitive sensor capable of identifying a touched location). To explain further, while placing both hands (at 10 and 2 positions) on a steering wheel (a steering control), the driver may indicate an intention to turn right or left by holding the steering wheel strongly a few times with the hand on the side that the driver intends to turn. In this example, the identifying device 23 is configured from a "hands on detection" sensor.

Example 3. Alternatively, a driver's intention to turn right (or left) may be indicated through a gesture. For example, a driver's intention to turn right (or left) may be indicated by pointing a finger to the right (or left) or closing a right eye (or left eye) so that the gesture is captured by an on-board camera facing the driver. In another example, a driver's intention to turn right (or left) may be indicated by swiping a finger to the right (or left) across a touchscreen (such as a touch panel display of a car navigation system 21). In this example, the identifying device 23 is configured from a device such as a camera.

Figure 2:
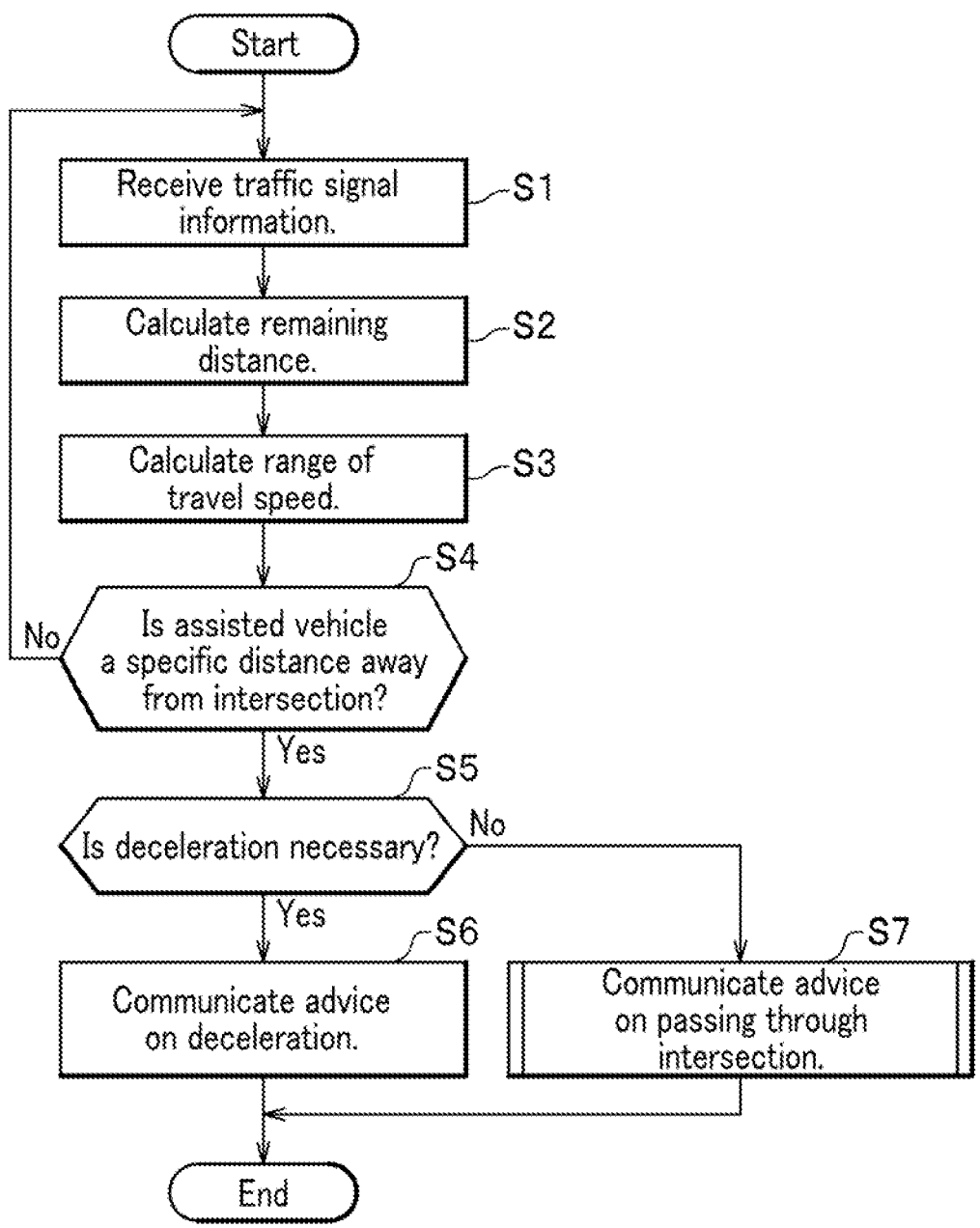
FIG. 2 is a flow chart of an overall process performed by a vehicle driving assistance system according to an embodiment.

Next, the process that is executed by the vehicle driving assistance system 1 is explained with the flow chart of FIG. 2.

When a vehicle installed with a vehicle driving assistance system 1 approaches an intersection, the receiver 11 receives traffic signal information of the intersection from a device such as an optical beacon at the intersection (step S1). This traffic signal information includes the following information regarding the traffic signal for the intersection that the vehicle is going to travel through: the currently illuminated color light, the next color light to be illuminated, the time required to change from the current color light to the next color light. Furthermore, if the traffic signal includes multiple aspects that are in accord with the directions of traffic movement at the intersection, the traffic signal information includes additional information. That is, if the traffic signal is installed with a right-turn arrow aspect, a left-turn arrow aspect, a straight-ahead arrow aspect, or any combination thereof, traffic signal information further includes the following information: the time taken (in seconds), from when the full red light is illuminated, for each installed arrow aspect to be illuminated, and the length of time each installed arrow aspect is illuminated.

Next, the remaining distance calculator 12 calculates a remaining distance to the intersection from the location of the assisted vehicle (step S2). The location of the assisted vehicle can be determined using the car navigation system 21. Hence the remaining distance may be calculated from the location of the assisted vehicle to the intersection found on map data. Next, the travel-speed-range calculator 13 calculates, based on the traffic signal information and the remaining distance, the range of travel speed within which the assisted vehicle is allowed to pass through an intersection by following the intersection's traffic signal (step S3). Next, the vehicle driving assistance system 1 determines whether or not the assisted vehicle is at a specific distance away from the intersection (step S4). This may be determined using information of the car navigation system 21. The specific distance is at a distance too far from the intersection for a turn signal lever to be operated or a lane change to take place.

When the assisted vehicle is at the specific distance away from the intersection ("Yes" in S4), the process advances to step S5. If, based on the calculated range of travel speed and the current speed of the assisted vehicle, driving assistance information for deceleration is needed ("Yes" in S5), the reporter 14 does the following: communicate information that assist deceleration of the assisted vehicle via an instrument panel 51 (details given later; equivalent to display 4) and/or an audio output 5 (using an audio message) (step S6). When deceleration is necessary, the assisted vehicle eventually comes to a halt at the intersection. If, based on the calculated range of travel speed and the current speed of the assisted vehicle, driving assistance information for passing through the intersection within the calculated range of travel speed may be provided ("No" in S5), the reporter 14 does the following: communicate information such as those that assist the driver to pass through the intersection within the calculated range of travel speed (step S7).

Figure 3:
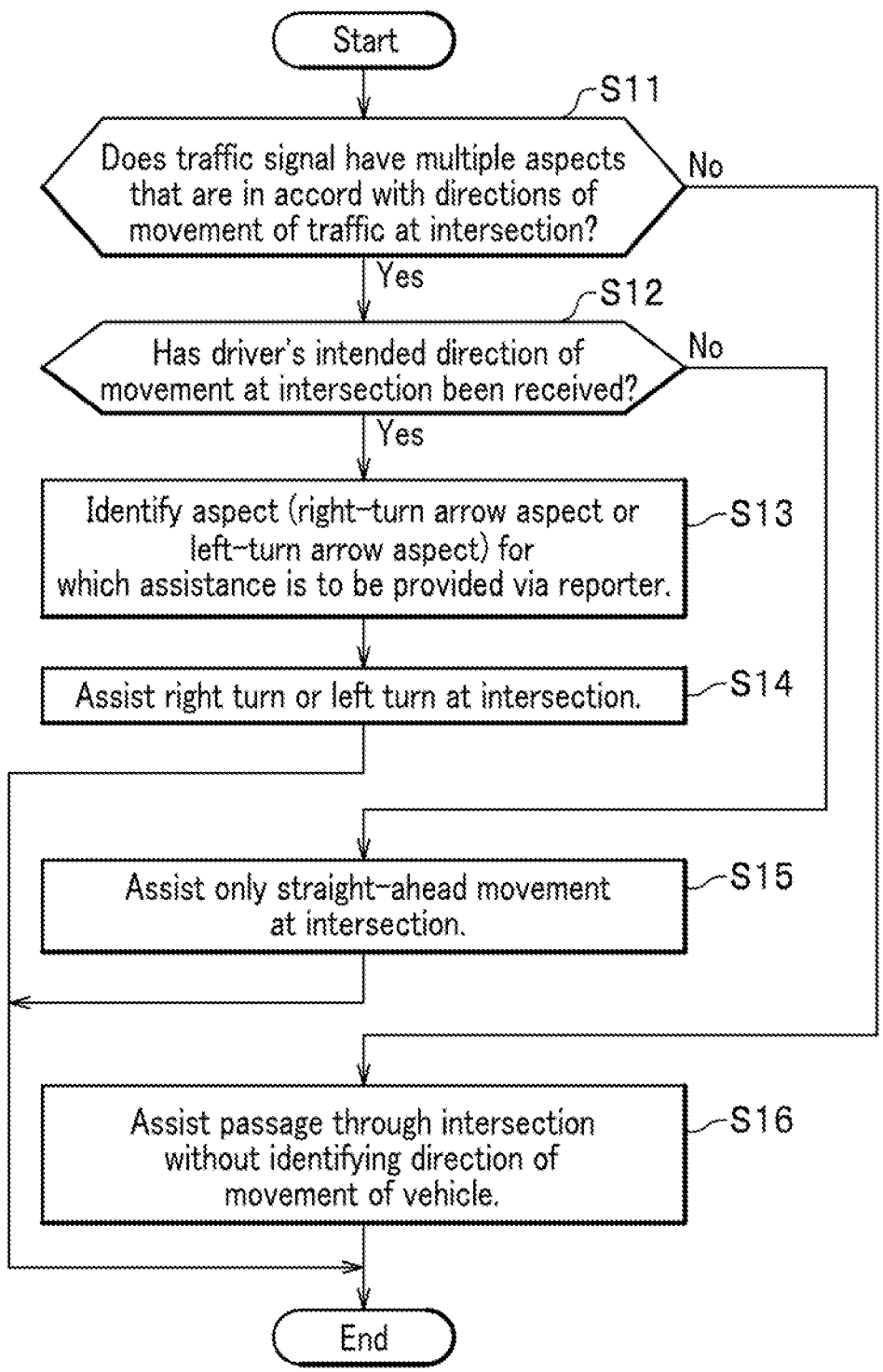
FIG. 3 shows a sub-routine for step S7 (FIG. 2) performed by a vehicle driving assistance system according to an embodiment.

FIG. 3 shows the step S7 subroutine. If the traffic signal includes multiple aspects that are in accord with the directions of traffic movement at the intersection ("Yes" in S11), the subroutine advances to step S12. In step 11, whether or not the traffic signal includes multiple aspects that are in accord with the directions of traffic movement at the intersection can be determined from whether or not the traffic signal information obtained in step S1 contains information on multiple aspects that are in accord with the directions of traffic movement. In step 12, the identifier 15 determines whether an intended direction of movement (an intention to turn right or left) at the intersection has been received from the driver through the identifying device 23. If the identifier 15 has received an intended direction of movement ("Yes" in S12), the aspect (a right-turn arrow aspect or left-turn arrow aspect) for which assistance is provided through communication by the reporter 14 is identified (step S13). The reporter 14 then assists the right turn or left turn of the assisted vehicle at the intersection in step S7 (step S14). If the identifier 15 does not receive an intended direction of movement (an intention to turn right or left) at the intersection from the driver ("No" in S12), the reporter 14 assists only a straight-ahead movement of the vehicle in step S7 (step S15). Note that if the traffic signal does not have multiple aspects that are in accord with the directions of traffic movement at the intersection, ("No" in S11), assistance is provided for passing through the intersection without identifying the direction of movement of the assisted vehicle at the intersection.

Figure 4:
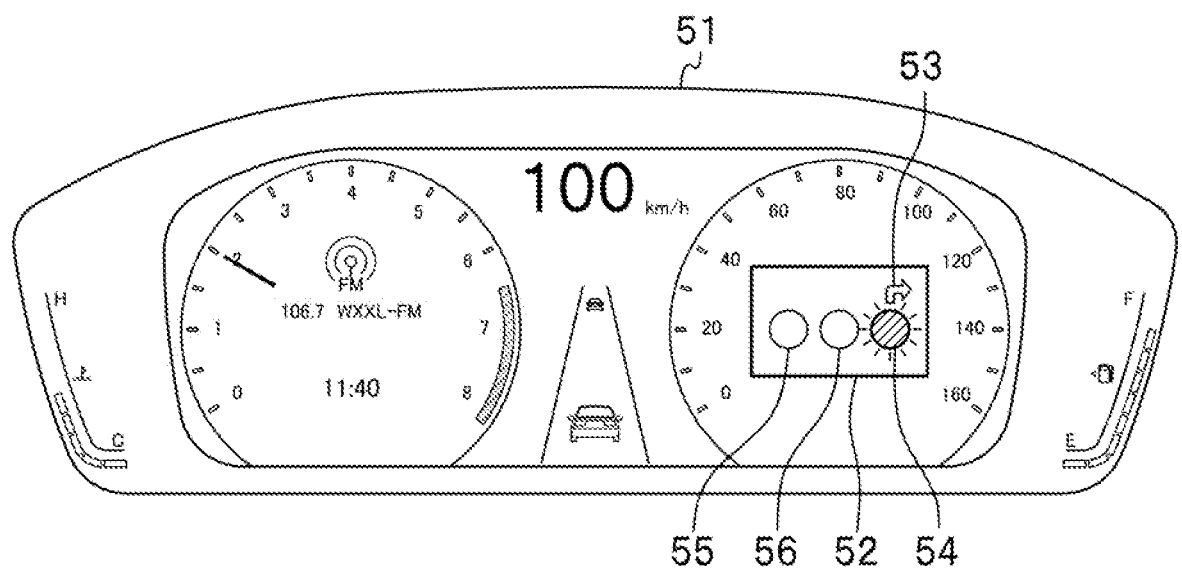
FIG. 4 is a plan view of an instrument panel according to an embodiment.

FIG. 4 is a plan view of an instrument panel 51 of an assisted vehicle. The instrument panel 51 (corresponding to display 4) displays, on intersection assistance information part 52, assistance information for passing through an intersection in the way explained above. The display on FIG. 4 shows an example where a driver has shown an intention to turn right at an intersection. In this example, the right turn is assisted with an illuminated right-turn arrow 53 (indicating the right turn at the intersection) and an illuminated right-turn indication lamp 54. In the case of a left turn, assistance is provided by illuminating a left-turn arrow (not shown in figure) and a left-turn indication lamp 55. In the case of going straight ahead, assistance is provided by illuminating a straight-ahead arrow (not shown in figure) and a straight-ahead indication lamp 56.

According to the vehicle driving assistance system 1 of the embodiment described above, assistance can be provided in accordance with a driver's intended direction of movement at an intersection when a traffic signal has multiple aspects that are in accord with the directions of traffic movement at the intersection. For example, if a driver showed an intention to turn right, assistance for a right turn at an intersection is provided according to the indication of a right-turn arrow aspect. In this way, the vehicle driving assistance system 1 can provide appropriate driving assistance to a driver of an assisted vehicle heading to enter an intersection.

If a driver's intended direction of movement at an intersection is unknown, there comes a need to provide assistance for a right turn, left turn, and go-straight-ahead movement at the intersection that is in accordance with a right-turn arrow aspect, left-turn arrow aspect, and straight-ahead arrow aspect that may be installed on the traffic signal. In such circumstances, passage assistance at an intersection can become overly complex. With the embodiment presented above, however, such complexity may be avoided.

It should be noted that the examples of the identifying device 23 that have been provided are merely examples, and that the identifying device 23 may be configured in other ways.

Although the invention has been described above by reference to certain embodiment, the invention is not limited to the embodiment described above. Modifications and variations of the embodiment described above will occur to those skilled in the art, in light of the above teachings. The scope of the invention is defined with reference to the following claims.

What is claimed is:

1. A vehicle driving assistance system comprising:
   a receiver;
   a remaining distance calculator;
   a travel-speed-range calculator;
   a reporter; and
   an identifier,
   wherein
   the receiver is configured to receive, from outside an assisted vehicle, traffic signal information for a traffic signal at an intersection, the traffic signal information comprising an illumination period of a color light of the traffic signal and information on a transition between illuminated color lights; wherein
   the remaining distance calculator is configured to calculate a remaining distance from a location of the assisted vehicle to the intersection; wherein
   the travel-speed-range calculator is configured to calculate a travel speed range within which the assisted vehicle is allowed to pass through the intersection while following the traffic signal based on the traffic signal information and the remaining distance; wherein
   the reporter is configured to give driving assistance information through communication via a display and/or an audio output based on the travel speed range and a current speed of the assisted vehicle, the communication being either to assist in deceleration or to assist in passage through the intersection within the travel speed range; and wherein
   when the traffic signal has multiple aspects that are in accord with directions of traffic movement at the intersection, the identifier receives an intended direction of movement at the intersection from a driver of the assisted vehicle and identifies one of the multiple aspects for which assistance is provided by the reporter through communication that is consistent with the driver's intended direction of movement.

2. A vehicle driving assistance system according to claim 1 wherein
   when the driver's intention to turn right or turn left at the intersection is not received, assistance through communication by the reporter is provided only for a straight-ahead aspect of the multiple aspects.

3. A vehicle driving assistance system according to claim 1, wherein
   the identifier receives the intended direction of movement by detecting a direction of operation of a turn signal lever by the driver.

4. A vehicle driving assistance system according to claim 1, wherein the vehicle driving assistance system further comprises a capacitive sensor that can locate a touched location, wherein the capacitive sensor receives the intended direction of movement by detecting a direction of change in a location where a steering control of the assisted vehicle is touched by the driver.

5. A vehicle driving assistance system according to claim 1, wherein the identifier receives the intended direction of movement by capturing an image of a gesture made by the driver with a camera.

6. A vehicle driving assistance system according to claim 1, wherein when the assisted vehicle is at a specific distance upstream of the intersection, the identifier receives the intended direction of movement at the intersection from the driver and identifies the aspect for which assistance is provided by the reporter through communication that is consistent with the driver's intended direction of movement.

* * * * *